Aug. 30, 1949.  H. S. CUMMINS  2,480,557
DETACHABLE THERMOCOUPLE HOUSING
Filed Aug. 2, 1946
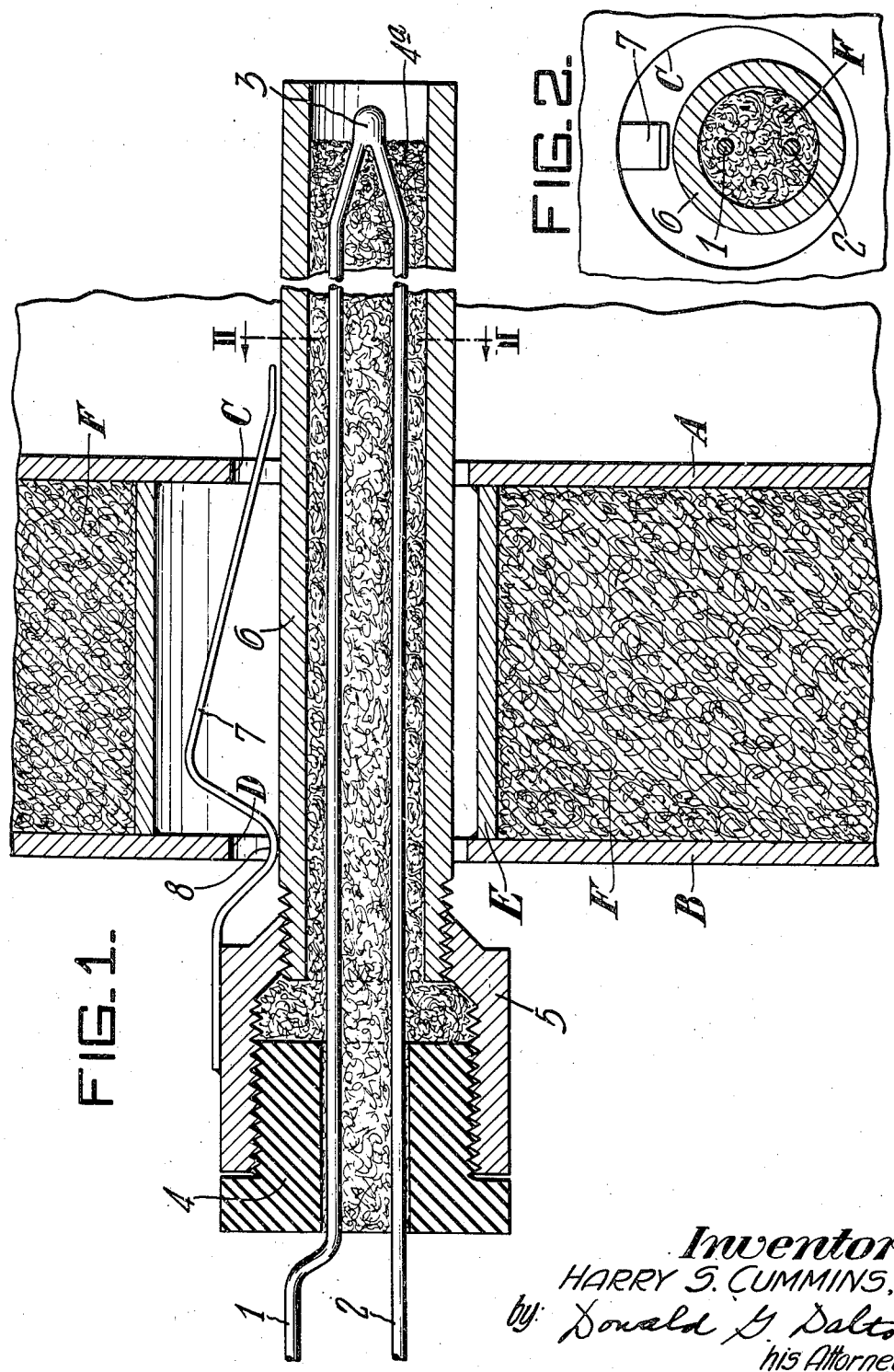
Inventor:
HARRY S. CUMMINS,
by: Donald G. Dalton
his Attorney.

Patented Aug. 30, 1949

2,480,557

UNITED STATES PATENT OFFICE 2,480,557

DETACHABLE THERMOCOUPLE HOUSING

Harry S. Cummins, Hammond, Ind.

Application August 2, 1946, Serial No. 688,005

2 Claims. (Cl. 136—4)

This invention relates to thermocouples and more particularly to an improved thermocouple assembly for obtaining accurate temperature readings from the interior of a controlled cooling car.

Before proceeding with the detailed description of the improved thermocouple of the present invention, it may be noted that in the case where the temperature of hot rails in a controlled cool car is desired, the thermocouple is inserted through an opening in the car wall located near the end of the car provided for this purpose. The end of the thermocouple where the wires are joined projects into the car and becomes the hot junction. At the other end of the couple the two wires are separated and extend just outside the car and is termed the cold junction. The thermocouple remains in its position in the car for the entire cooling cycle, so that a portable millivoltmeter may be connected at two hour intervals to the thermocouple, and the temperature is thus read. The temperature of the cold junction pair being maintained constant at the prevailing atmospheric temperature, the resultant E. M. F. as measured by the meter, varies only with the temperature of the hot junction.

The millivoltmeter employed is usually of the compensated type which automatically makes compensation for the atmospheric temperature so that the reading represents the actual temperature of the rails in the car.

It is accordingly an object of my invention to provide a thermocouple construction which is rugged, which is constructed so as to assure accurate temperature readings, and which will not become lost when the controlled cooling cars are moved on the tracks.

The invention will be understood more readily from the accompanying drawing which shows, in Figure 1, a longitudinal sectional elevation of an improved thermocouple assembly embracing the features of the present invention, the assembly being shown mounted in the side of a controlled cool car that is shown fragmentarily in sectional elevation.

Figure 2 is a transverse sectional elevation on the line II—II of Figure 1.

Referring more particularly to the drawings, reference letters A and B represent, respectively, the inside wall and the outside wall of a controlled cool car, which walls are adapted to receive the thermocouple assembly by way of registering holes C and D, that are enclosed in a pipe spacer E. The space between walls A and B are filled with rock wool insulation F, for which the pipe spacer E acts as a retainer.

The thermocouple assembly of the present invention comprises the thermocouple wires 1 and 2, which are of different metals, and which are welded together to form the hot junction 3. The wires 1 and 2 project through a plug 4 at the cold junction and are enclosed in asbestos insulation 4a which is packed in the hole of the plug 4. This plug 4 is made of dielectric material such as Bakelite, or other thermoplastic material of electrical nonconducting properties, so that the E. M. F. or voltage generated in the thermocouple wires 1 and 2 will not be affected.

The plug 4 is provided with standard pipe threads which fit into one end of the standard pipe reducing coupling 5. The other end of the pipe reducing coupling 5 is interiorly threaded to receive a pipe 6 which encloses the wires 1 and 2 and protects them from damage when the thermocouple is inserted into the controlled cooling car. If desired, the wires 1 and 2 may be provided with asbestos insulation along their entire length. The pipe 6 preferably is made of ferrous metal, such as steel, in order to resist the temperatures to which it is subjected.

Mounted on the coupling 5 is a leaf spring 7 that is shaped as shown, and which is rigidly secured to the coupling 5. The leaf spring 7 can be compressed sufficiently to enter through the hole D as the thermocouple assembly is advanced into operating position, but when entered through the hole as far as the recess 8, it will expand to form a latch, the bend in the spring being sufficient to obstruct accidental displacement of the thermocouple assembly from its operative position, with attendant loss or damage, once the thermocouple assembly has been inserted into its operative position, while enabling removal of the assembly upon exerting a stronger pull thereon.

It will be seen from the drawings and from the foregoing description that in the improved thermocouple assembly of the present invention, the thermocouple wires 1 and 2 are each in one uninterrupted piece with no intermediate contact blocks or terminals between the hot junction and the cold junction. The thermocouple wires extend from the hot junction 3 between the hot rails in the controlled cooling cars through an insulating plug and terminate a few inches beyond the outside of the car. In this manner, the wire socket at the millivoltmeter may be connected directly to the thermocouple wires without any intermediate lead wires. The advantages of this arrangement are obvious. There are no screws or terminals to work loose, and thus adversely affect the correct temperature readings. Loss in potential in the thermocouple wires, due to closeness of the terminals, is avoided. The present improved thermocouple assembly is constructed of a minimum number of parts easily obtainable in the shops.

The feature of the steel spring 7, which is attached permanently to the pipe reducing coupling 5, eliminates a major complaint. Many of the present couples in use are lost in transit when the cars are being moved, and are not available when the temperature of the hot rails should be checked. Too long delays in procuring a new couple to take the place of that lost, in addition to the time required for the new couple to be heated to the temperature of the rails, may result in the loss of a carload of rails.

It will be understood of course that the pipe or sleeve element 6 is composed of any suitable refractory metal that is resistant to oxidation, an oxidation resisting steel being very suitable for this purpose. The threaded connections between the plug 4 and coupling 5, and between the coupling 5 and pipe 6, permit ready assembling and disassembling of the parts.

It will be seen that the construction of the present invention is simple and rugged, eliminating an expensive and rather complicated terminal head casting which is a feature of conventional thermocouple constructions and the source of difficulty in making the requisite connections to the temperature indicating millivoltmeter, poor connections resulting in inaccurate readings. Also, danger of poor connections between the thermostatic elements and the contact screws fastening the thermostatic elements in the terminal head, is eliminated, thereby doing away with another source of potential inaccuracies.

It will be understood that the foregoing description and accompanying drawings are illustrative of one embodiment of the present invention, but that variations in structural details may be made without departing from the scope of the invention as defined by the appended claims.

I claim:

1. A thermocouple assembly adapted to be inserted through an opening in a wall of a container holding articles the temperature of which is to be measured, which comprises in combination, a hollow plug, a pipe reducing coupling threadedly mounted on the plug, a pipe threadedly mounted in the coupling, thermocouple wires passing uninterruptedly through the plug from a point substantially beyond the plug and thence substantially into the pipe, the thermocouple wires being welded together within the pipe to form a hot junction, and resilient latching instrumentalities comprising a leaf spring mounted on the coupling, the spring being bent towards the pipe to form a recess, one side of which slopes from the pipe for a sufficient distance to provide latching, the leaf spring then sloping gradually downwardly towards the pipe at a slope permitting ready insertion of the pipe in the said opening until the said recess registers with the opening, the slope of the said recess preventing accidental displacement of the thermocouple assembly from operative position while enabling retraction of the assembly from the opening by application of a relatively strong manual pull on the assembly, thereby causing depression of the spring against the container wall until the assembly can be withdrawn through the opening.

2. A thermocouple assembly adapted to be inserted through an opening in a wall of a container holding articles the temperature of which is to be measured, which comprises in combination, a refractory metallic tubular sleeve, one end of which is adapted to be the inner end of the sleeve when the assembly is operatively mounted on the said wall, an opposite end of the tubular sleeve being adapted to become the outer end of the sleeve when the assembly is operatively mounted on the said wall, a metallic coupling member mounted on the sleeve adjacent to the said outer end thereof, and having an outside diameter substantially greater than that of the sleeve, a hollow electrically insulating plug member mounted in the coupling member defining a closure therefor, a pair of thermocouple wires extending from substantially beyond the plug member and into the sleeve to a point adjacent to the inner end of the sleeve, the said thermocouple wires being welded together at that point to form a hot junction, the said thermocouple wires diverging beyond the said plug member for minimizing possibility of accidental contact therebetween, the said wires being adapted to be connected directly to a thermoelectric current measuring instrument, insulating material for both heat and electricity enclosing the wires and defining a packing intermediate the said wires and sleeve and intermediate the wires and the plug member, and a spring latch welded to the said coupling member adapted to be compressed responsively to entering movement of the assembly through the opening in the said wall as the assembly is mounted therein, the said spring latch suddenly expanding to latching position responsively to predetermined entering movement of the assembly, thereby retaining the assembly mounted in the wall against accidental displacement.

HARRY S. CUMMINS.

REFERENCES CITED

The following references are of record in the file of this patent:

UNITED STATES PATENTS

| Number | Name | Date |
|---|---|---|
| 1,140,701 | Mitchell | May 25, 1915 |
| 1,426,337 | Sperry | Aug. 15, 1922 |
| 1,478,821 | Foster | Dec. 25, 1923 |
| 1,675,210 | Campbell, et al. | June 26, 1928 |
| 1,937,199 | Kathner | Nov. 28, 1933 |
| 1,994,268 | Bartels | Mar. 12, 1935 |
| 2,439,464 | Good | Apr. 13, 1948 |

FOREIGN PATENTS

| Number | Country | Date |
|---|---|---|
| 276,570 | Great Britain | Sept. 1, 1927 |
| 399,541 | Great Britain | Oct. 5, 1933 |